Figure 1:
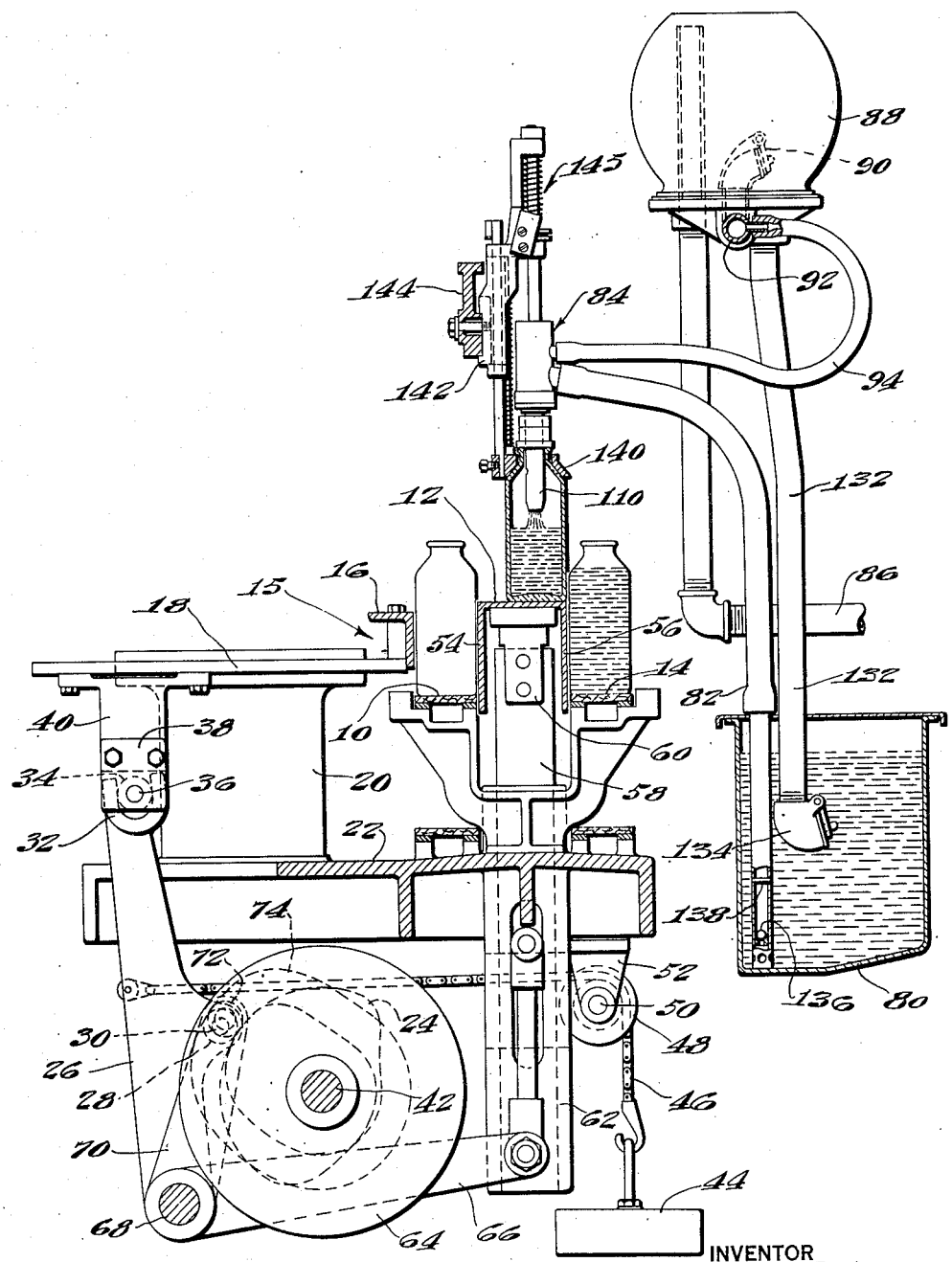

Feb. 7, 1939. S. R. HOWARD 2,146,072
RECEPTACLE FILLING MACHINE
Filed Aug. 2, 1935 2 Sheets-Sheet 2
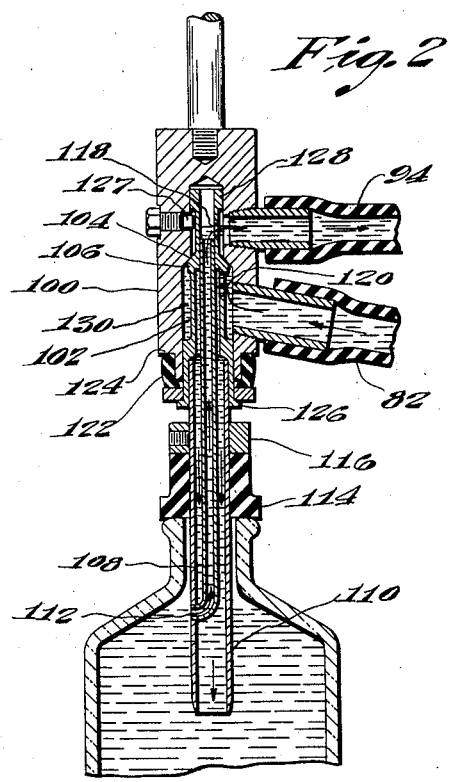
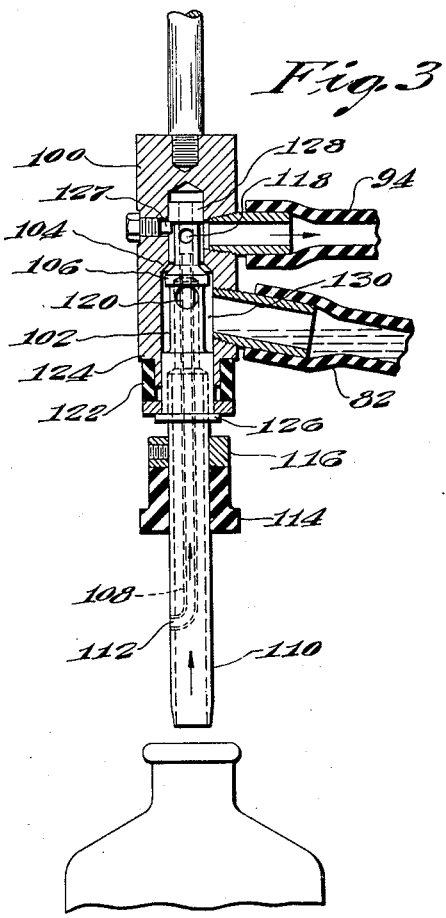
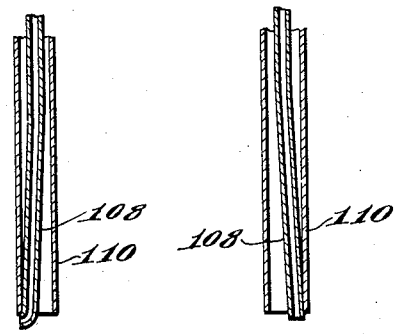
INVENTOR
Stanley R. Howard
BY J. Stanley Churchill
ATTORNEY Patented Feb. 7, 1939

2,146,072

UNITED STATES PATENT OFFICE 2,146,072

RECEPTACLE FILLING MACHINE

Stanley R. Howard, Milton, Mass., assignor to Pneumatic Scale Corporation, Limited, Quincy, Mass., a corporation of Massachusetts Application August 2, 1935, Serial No. 34,343

6 Claims. (Cl. 226—116)

This invention relates to a container filling machine, and more particularly to a container filling machine adapted to fill the containers upon the vacuum principle.

The invention has for an object to provide a novel and improved receptacle filling machine of the character specified, in which provision is made for reducing to a minimum liability of dripping of the liquid from the filling nozzle at the end of each filling operation and after the bottle has been removed from the nozzle.

A further and more specific object of the invention is to provide a novel and improved filling nozzle assembly which may be economically manufactured, is simple in construction, and which is particularly adapted for use in a filling machine operating upon the vacuum principle for preventing dripping from the filling nozzle.

With these general objects in view and such others as may hereinafter appear, the invention consists in a container filling machine and the filling nozzle assembly and in the various structures, arrangements, and combination of parts hereinafter described and particularly defined in the claims at the end of this specification.

In the drawings, illustrating the preferred embodiment of the invention, Fig. 1 is a sectional view of a container filling machine, Figs. 2 and 3 are enlarged sectional views of the filling nozzle assemblies shown in closed and open positions respectively, and Figs. 4 and 5 are sectional views of modified forms of the nozzle ends.

In a filling machine embodying the present invention, provision is made for filling the bottles or other receptacles upon the well-known vacuum principle, in which a bottle is elevated into position to be sealed at the suction nozzle, and provision is made for evacuating the bottle or partially evacuating the bottle by the connection of the filling nozzle with a source of vacuum. The vacuum thus created within the bottle is then utilized to draw liquid into the bottle until the latter has become filled to the level of the suction nozzle, whereupon the excess liquid is drawn with the suction and caught in a trap to be subsequently returned to the source of supply of liquid from which the bottles are to be filled. In accordance with the present invention, the machine is provided with a valve adapted to connect the suction line directly with the filling nozzle to the end that when a bottle is removed after a filling operation, the portion of the liquid remaining within the filling nozzle proper may be drawn by the suction into the suction line to be conveyed into the aforesaid trap and subsequently returned to the liquid supply tank. In order that the valve may operate with maximum efficiency and be positive in its operation, provision is preferably made for mechanically moving the valve to open and close the same, and thereby establish and cut off the connection between the suction line and the interior of the suction nozzle in timed relation to the movements of the bottle into and from bottle filling position. In the preferred form of the invention, the machine is provided with a direct mechanical connection between the valve and the usual resilient sealing member, by which the mouth of the bottle is sealed. In the preferred form of the machine, a novel and improved filling nozzle assembly is provided in which the valve is mechanically connected to the sealing member and the latter is arranged to be moved by the elevation or movement of the bottle into bottle sealing position. Provision is made for assisting the return of the parts after the filling operation has been completed and the bottle is removed, and the structure is such as to be conducive to economical manufacture and efficient and simple assembly, as well as ease in replacement of parts.

Referring now to the drawings, the present invention is shown as embodied in a typical vacuum filling machine such as is shown and described in the United States patent to Pennock, No. 1,737,677 to which reference may be made for the general construction of such a machine. In the illustrated machine the bottles are brought into the machine on an incoming conveyor comprising a belt 10. Provision is made for transferring the bottles from their positions on the incoming conveyor belt 10 onto the bottle supporting member 12 when the latter is in its depressed position with its surface flush with the surface of the conveyor belt 10.

As illustrated herein the bottle pushing mechanism, generally indicated at 15 operates to transfer the empty bottles from the belt 10 to the bottle supporting member 12 and to simultaneously effect the transfer of the filled bottles from a position under the filling nozzles onto a discharge conveyor comprising a belt 14. As herein shown, the bottle pushing mechanism comprises a bar 16 mounted on a slide 18 guided in brackets 20 mounted on the platen 22 of the machine. The slide 18 has a reciprocating motion imparted to it by a cam 24 which operates on a lever 26 through a cam roll 28 and cam roll pin 30 fastened in the cam lever 26. The upper end of the cam lever 26 has a forked end 32 which embraces a roll 34 free on a stud 36 fastened in a plate 38 adjustably clamped to a bracket 40 attached to the slide 18. The cam 24 is attached to a cam shaft 42, rotated through any suitable driving mechanism, not shown. A counter balance weight 44 is attached to the cam lever 26 by a chain 46 running over a pulley 48 free to turn on a pin 50 attached to a bracket 52 fastened to the underside of the platen 22.

The bottle supporting and elevating member 12 is formed with downwardly extending sides 54, 56, to form side guides for the empty bottles being conveyed into the machine on the incoming conveyor belt 10 and also for the filled bottles leaving the machine on the outgoing conveyor. Provision is made for automatically moving the bottle supporting and elevating member 12 at predetermined times in the cycle of operation of the machine in order to elevate the bottles to filling position and to subsequently lower the member 12 to a position flush with the incoming belt 10 and discharge belt 14, and for this purpose the member 12 is rigidly attached to slide members 58 by means of brackets 60. The slide members 58 are guided in slideways formed in brackets 62 supported by the platen 22 above referred to. The bottle supporting and elevating member 12 is actuated by a cam 64 fast on the cam shaft 42 by connections between it and the cam including a lever 66 fast on the rock shaft 68 and including a cam lever 70 also fast on the rock shaft 68 and which is provided with a cam roll 72 operating in the path 74 of the elevating cam 64. During the operation of the machine, when the bottle supporting and elevating member 12 is in its lower position, the bottle pushing bar 16 operates to push a row of empty bottles from the incoming conveyor belt into a position upon the bottle supporting member 12 under the filling nozzles and at the same time the row of previously filled bottles are pushed laterally from the bottle supporting and elevating member 12 onto the outgoing conveyor belt 14 to be discharged from the machine.

As previously stated, the bottles are filled by the well known vacuum principle, and as herein shown, the liquid with which the bottles are to be filled is contained in a tank 80 located at the back of the machine and below the level of the bottles to be filled. The liquid is drawn by vacuum created in the bottle through a suction pipe 82, one end of which is immersed in the liquid of the tank, the other end being connected to the nozzle assembly, generally indicated at 84, as will be described. A suction pump, not shown, of well known construction is connected to a pipe 86 which leads into and has an opening at the top of an inverted bowl 88. A vacuum is created in the bowl 88 by the suction pump and when the mouth of the bottle is sealed, the vacuum in the bowl operates to evacuate the bottle through a check valve 90, a pipe 92 and flexible tubing 94 to the nozzle assembly. The suction in the bottle is connected with the suction pipe 82.

As hereinbefore stated, the filling nozzle assembly is constructed so as to reduce to a minimum the liability of dripping of the liquid from the filling nozzle at the end of each filling operation and after the bottle has been removed from the nozzle. As herein shown, see Figs. 2 and 3, the filling nozzle assembly includes a nozzle block 100 in which a valve member 102 is mounted. The nozzle block is provided with a valve seat 104 which cooperates with a valve 106 formed on the valve member 102. The valve member 102 is provided with an air nozzle 108 mounted within an outer liquid nozzle 110. Both nozzles are fixed to the valve member 102 and formed as an integral part thereof. The lower end of the air nozzle 108 communicates with a hole 112 in the side of the liquid nozzle 110 as shown in Fig. 2. The outer nozzle 110 is provided with a sealing collar 114 which is adjustably maintained in position by provision of a collar 116. The air nozzle is connected to the vacuum in the bowl 88 through the flexible tubing 94 as above described, and through the passageway 118 in the side of the valve member 102 as indicated by the arrows and the liquid nozzle is connected to the suction pipe 82 through the passageway 120 in the side of the valve member 102. The lower end of the nozzle block is provided with a yieldable collar 122 mounted between a shoulder 124 on the block and a flange member 126 formed integral with the valve member 102. Normally the valve is held in its open position, see Fig. 3, by the resistance of the collar 122 and the valve member 102 is prevented from being separated from the block by provision of a set screw 127 which engages with the underside of a flanged portion 128 of the valve member 102.

During the filling operation, when the bottle supporting member 12 is elevated to present the mouth of the bottles into sealing engagement with the collar 114 the unit including the valve member 102 is elevated against the yielding resistance of the collar 122 to close the valve 106 against the valve seat 104. When the air is exhausted from the bottle through the air nozzle 108, the liquid in the tank 80 will be caused to flow through the suction pipe 82 through the passageway 120 and through the liquid nozzle 110 into the bottle. When the bottle is filled so that the liquid reaches the air nozzle extending through the side of the liquid nozzle, the suction from the vacuum pump draws off any further liquid coming into the bottle through the air nozzle 108, passageway 118, flexible tube 94 and into the bowl 88, and the surplus liquid may subsequently be drawn back to the tank 80, thus filling all bottles to the same height.

It will be observed that the filling operation automatically commences when the elevating member 12 lifts the bottles to filling position and is completed before the elevator again descends. When the elevator descends and the contact is broken between the rubber collar 114 and the mouth of the bottles, the suction in the bottle is broken and the flow of liquid from the tank 80 through the liquid nozzles 110 is terminated. In order to reduce to a minimum the liability of dripping from the nozzle, at the end of the filling operation, when the bottle is caused to descend, the valve 106 is opened by the rubber collar 122 to permit the suction line 94 to be directly connected to the filling nozzle 110 through the valve opening 104, chamber 130, and passageway 120 into the filling tube, to the end that the portion of liquid remaining within the filling nozzle may be drawn by the suction into the suction line to be conveyed into the bowl 88. Any surplus liquid that is drawn into the bowl 88 finds its way back to the tank 80 through a drain pipe 132 which is provided on its end with a check valve 134 for preventing the flow of liquid through this pipe when the bowl 88 is under vacuum.

The suction pipe 82 is provided at its lower end with the usual ball check valve 136 so that whatever liquid remains in the pipe will be held therein when the seal between the bottle and the nozzle is broken. A stop 138 is provided to limit the upward movement of the ball, and the ball is held against this stop by the upward flow of the liquid.

After the bottles have been filled in the manner described and the elevator has been moved to its lower position, the filled bottles are ejected onto the outgoing belt 14 by the movement of the empty bottles into the position beneath the filling nozzles, as previously described.

As a modification of the mounting of the air nozzle 108, the tube may extend below and to one side of the filling nozzle 110, as shown in Figs. 4 and 5.

The usual provision is made for guiding the bottles into engagement with the filling nozzle and as herein shown the nozzle guide 140 is yieldably mounted in a bracket 142 secured to a cross frame 144. The nozzle guide also operates to assist in breaking the seal between the bottle and the sealing collar 114 when the elevating member is lowered.

The usual resilient mounting of the nozzle block as indicated at 145 is also provided to allow the filling nozzle blocks 84 to yield slightly as the mouth of the bottles comes in contact with the rubber collars on the nozzles. Also if a bottle should be out of proper alignment with a nozzle when the elevator is raised and any one of the nozzles should strike the top edge of the bottle, the unit will yield and thus prevent breakage of the nozzle parts.

From the description thus far it will be observed that by the provision of the valve 102 for exhausting liquid from the filling line at the end of each filling operation it is possible to utilize a much larger filling nozzle than has heretofore been possible without incurring liability of dripping from the nozzle. Heretofore the maximum size of nozzle depended upon the viscosity of the liquid and upon other factors, and the present invention contributes to the speed with which the bottles or other containers may be filled.

While the preferred embodiments of the present invention have been herein illustrated and described, it will be understood that the invention may be embodied in other forms within the scope of the following claims.

Having thus described the invention what is claimed is:—

1. In a container filling machine, in combination, a container supporting means, a filling nozzle having a liquid nozzle, a suction nozzle, and a sealing member for the container, a suction line, a valve arranged when opened to connect the suction line and the liquid nozzle, and means operated by the movement of the container into and from sealing position for operating the valve.

2. In a container filling machine, in combination, a container supporting means, a filling nozzle having a liquid nozzle, a suction nozzle, and a sealing member for the container, a suction line, a valve arranged when opened to connect the suction line and the liquid nozzle, and connections between the sealing member and the valve for operating the valve.

3. In a container filling machine, in combination, a container supporting means, a filling nozzle having a liquid nozzle and a suction nozzle, one of said nozzles being within the other, a sealing member secured to the outer nozzle, and a valve connected to the sealing member to be moved upon movement of the sealing member for connecting the suction line to the liquid nozzle.

4. In a container filling machine, in combination, a container supporting means, a filling nozzle having a liquid nozzle, a suction nozzle, and a sealing member for the container, a suction line, a valve arranged when opened to connect the suction line and the liquid nozzle, and means for automatically and positively operating the valve in timed relation to the movements of the container into and from sealing position whereby to connect the suction line and liquid nozzle at the end of the filling operation, and resilient means for returning the filling nozzle to its former position after each filling operation.

5. In a container filling machine, in combination, a filling nozzle having a liquid nozzle and a suction nozzle, a suction line, and a valve arranged when opened to connect the suction line and the liquid nozzle, and valve operating means actuated by movement of the filling nozzle.

6. In a container filling machine, in combination, a block provided with a valve chamber therein, a valve in the valve chamber arranged when closed to subdivide the chamber into a suction chamber and a liquid chamber, a suction line connected to the suction chamber, a liquid line connected to the liquid chamber, a movable filling nozzle connected to the valve and provided with a suction nozzle and a liquid nozzle, whereby the movement of the filling nozzle by the container when being moved into filling position operates to close the valve.

STANLEY R. HOWARD.